United States Patent
Kwon et al.

(10) Patent No.: US 11,429,785 B2
(45) Date of Patent: Aug. 30, 2022

(54) SYSTEM AND METHOD FOR GENERATING TEST DOCUMENT FOR CONTEXT SENSITIVE SPELLING ERROR CORRECTION

(71) Applicant: Pusan National University Industry-University Cooperation Foundation, Busan (KR)

(72) Inventors: Hyukchul Kwon, Busan (KR); Jung-Hun Lee, Busan (KR)

(73) Assignee: Pusan National University Industry-University Cooperation Foundation, Busan (KR)

( * ) Notice: Subject to any disclaimer, the term of this patent is extended or adjusted under 35 U.S.C. 154(b) by 0 days.

(21) Appl. No.: 17/327,072

(22) Filed: May 21, 2021

(65) Prior Publication Data
US 2022/0164530 A1 May 26, 2022

(30) Foreign Application Priority Data
Nov. 23, 2020 (KR) .......................... 10-2020-0158196

(51) Int. Cl.
*G06F 40/232* (2020.01)
*G06F 40/242* (2020.01)
(Continued)

(52) U.S. Cl.
CPC .......... *G06F 40/232* (2020.01); *G06F 40/166* (2020.01); *G06F 40/242* (2020.01); *G06F 40/279* (2020.01); *G06F 40/30* (2020.01)

(58) Field of Classification Search
CPC .... G06F 40/232; G06F 40/166; G06F 40/242; G06F 40/279; G06F 40/30
See application file for complete search history.

(56) References Cited

U.S. PATENT DOCUMENTS 6,618,697 B1 * 9/2003 Kantrowitz ........... G06F 40/232
703/2
7,047,493 B1 * 5/2006 Brill ..................... G06F 40/232
715/257
(Continued)

FOREIGN PATENT DOCUMENTS

KR 10-2015-0092879 A 8/2015
KR 10-2018-0113849 A 10/2018
(Continued)

OTHER PUBLICATIONS

Jayanthi, Sai Muralidhar and Pruthi, Danish and Neubig, Graham, "NeuSpell: A Neural Spelling Correction Toolkit"; Oct. 21, 2020; 7 pages; https://arxiv.org/abs/2010.11085 (Year: 2020).*
(Continued)

*Primary Examiner* — Benjamin Smith
(74) *Attorney, Agent, or Firm* — Paratus Law Group, PLLC

(57) ABSTRACT

Disclosed is a system for generating test documents for context-sensitive spelling error correction. The system includes: an input unit inputting an error-free document for generating an error document; an error target word segment test unit checking possibility of an error in a word segment by sequentially examining word segments of the entire sentences in the document input through the input unit and searching for a candidate word appearing at the corresponding position together with surrounding context; an error word candidate selection unit selecting error word candidates among candidate words found at the corresponding position by considering edit distances to a correct word and keyboard typographical errors; and an error word determination and presentation unit calculating probabilities of an error word candidate and its surrounding context and deter-
(Continued)

mining an error word of the highest priority as a final error word.

7 Claims, 2 Drawing Sheets

(51) Int. Cl.
    *G06F 40/166*     (2020.01)
    *G06F 40/30*     (2020.01)
    *G06F 40/279*     (2020.01)

(56) References Cited

U.S. PATENT DOCUMENTS

| | | | | |
|---|---|---|---|---|
| 7,290,209 | B2* | 10/2007 | Brill | G06F 40/232 715/257 |
| 7,660,806 | B2* | 2/2010 | Brill | G06F 40/232 707/999.101 |
| 7,941,418 | B2* | 5/2011 | Arguelles | G06F 16/951 707/739 |
| 8,341,520 | B2* | 12/2012 | Iakobashvili | G06F 40/232 715/257 |
| 8,798,984 | B2* | 8/2014 | Cancedda | G10L 15/197 704/9 |
| 9,037,967 | B1* | 5/2015 | Al-Jefri | G06F 40/232 715/257 |
| 9,298,683 | B2* | 3/2016 | Bhatt | G06F 11/3684 |
| 9,460,069 | B2* | 10/2016 | Bhatt | G06F 11/3684 |
| 9,519,634 | B2* | 12/2016 | Flor | G06F 40/216 |
| 9,582,489 | B2* | 2/2017 | McAteer | G06F 40/232 |
| 9,747,272 | B2* | 8/2017 | Ouyang | G06F 40/242 |
| 10,095,684 | B2* | 10/2018 | Willson | G06F 3/0237 |
| 10,372,814 | B2* | 8/2019 | Gliozzo | G06F 16/3322 |
| 10,402,490 | B1* | 9/2019 | Benavides | G06F 40/232 |
| 10,579,729 | B2* | 3/2020 | Gliozzo | G06F 16/3322 |
| 10,803,241 | B2* | 10/2020 | Weisman | G06F 40/30 |
| 10,936,813 | B1* | 3/2021 | Gupta | G06F 40/263 |
| 11,151,317 | B1* | 10/2021 | Singh | G06F 40/232 |
| 11,170,166 | B2* | 11/2021 | Bellegarda | G06N 7/005 |
| 2007/0106977 | A1* | 5/2007 | Arguelles | G06F 40/263 707/E17.108 |
| 2010/0180198 | A1* | 7/2010 | Iakobashvili | G06F 40/232 715/257 |
| 2011/0295897 | A1* | 12/2011 | Gao | G06F 16/3322 707/780 |
| 2012/0278060 | A1* | 11/2012 | Cancedda | G06F 40/44 704/2 |
| 2013/0061139 | A1* | 3/2013 | Mahkovec | G06F 40/232 715/257 |
| 2013/0339001 | A1* | 12/2013 | Craswell | G06F 40/30 704/9 |
| 2014/0188460 | A1* | 7/2014 | Ouyang | G06F 3/04883 704/9 |
| 2016/0179774 | A1* | 6/2016 | McAteer | G06F 40/232 704/9 |
| 2016/0335244 | A1* | 11/2016 | Weisman | G06F 40/242 |
| 2018/0107642 | A1* | 4/2018 | Gliozzo | G06F 40/232 |
| 2018/0107643 | A1* | 4/2018 | Gliozzo | G06F 40/232 |
| 2018/0143965 | A1* | 5/2018 | Willson | G06F 40/30 |
| 2020/0104357 | A1* | 4/2020 | Bellegarda | G06N 3/088 |
| 2020/0356626 | A1* | 11/2020 | Cogley | G06F 40/242 |
| 2021/0141860 | A1* | 5/2021 | Karagiannis | G06N 20/00 |
| 2021/0326525 | A1* | 10/2021 | Kwon | G06F 40/279 |

FOREIGN PATENT DOCUMENTS

| | | | |
|---|---|---|---|
| KR | 102348845 | B1 * | 5/2019 |
| KR | 10-2019-0133624 | A | 12/2019 |

OTHER PUBLICATIONS

Paul Rodrigues and C. Anton Rytting. 2012. Typing Race Games as a Method to Create Spelling Error Corpora. In Proceedings of the Eighth International Conference on Language Resources and Evaluation (LREC'12), pp. 3019-3024, Istanbul, Turkey. European Language Resources Association (ELRA). (Year: 2012).*

Zaanen, Menno & Van Huyssteen, Gerhard. (2009). Various Uses of a Spelling Checker Project: Practical Experiences, Teaching, and Learning. Southern African Linguistics and Applied Language Studies. 21. 10.2989/16073610309486352. (Year: 2009).*

Eric Brill and Robert C. Moore. 2000. An improved error model for noisy channel spelling correction. In Proceedings of the 38th Annual Meeting on Association for Computational Linguistics (ACL '00). Association for Computational Linguistics, USA, 286-293. DOI:https://doi.org/10.3115/1075218.1075255 (Year: 2000).*

Zaanen, Menno & Van Huyssteen, Gerhard. (2009). Various Uses of a Spelling Checker Project: Practical Experiences, Teaching, and Learning. In: Southern African Linguistics and Applied Language Studies. 2003 ; vol. 21, No. 4. pp. 327-340. https://doi.org/10.2989/16073610309486352 (Year: 2003).*

Gerhard B. van Huyssteen, Roald Eiselen & Martin Puttkammer. 2004. Evaluating evaluation metrics for spelling checker evaluations. In Proceedings of First Workshop on International Proofing Tools and Language Technologies, pp. 91-99, Patras: University of Patras, Greece. (Year: 2004).*

* cited by examiner

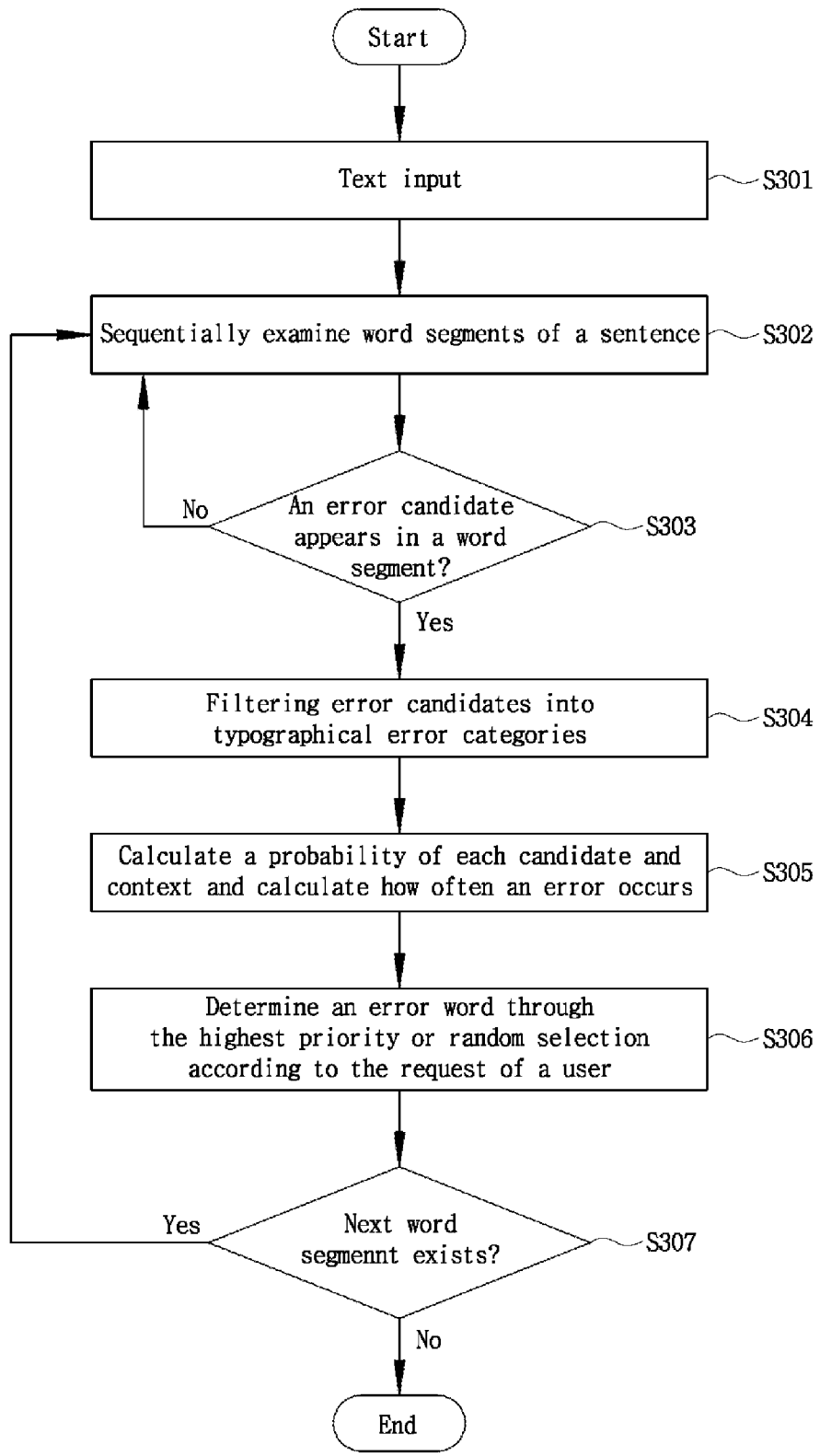

SYSTEM AND METHOD FOR GENERATING TEST DOCUMENT FOR CONTEXT SENSITIVE SPELLING ERROR CORRECTION

ACKNOWLEDGEMENT

This work was supported by an Institute for Information & Communications Technology Planning & Evaluation (IITP) grant funded by the Korean government (MSIT) (No. 2013-2-00131, Development of Knowledge Evolutionary WiseQA Platform Technology for Human Knowledge Augmented Services).

CROSS-REFERENCE TO RELATED APPLICATION

This application claims priority to Korean Patent Application No. 10-2020-0158196, filed on Nov. 23, 2020, which is hereby incorporated by reference in its entirety.

BACKGROUND

The present disclosure relates to a test of spelling error correction and, more particularly, to a system and method for generating test documents for context-sensitive spelling error correction to increase test efficiency by generating, based on statistical data, various errors found in plain documents written in text.

In the early days of human written language, documents were written by hand, but most documents are now written using a keyboard. There is a significant difference between errors in handwriting and errors in a keyboard input process; since errors in handwriting mainly result from human ignorance, errors in the keyboard input process make the most significant difference between the past and present error patterns.

As the absolute size of a corpus increases, the corpus tends to contain various errors.

Conventionally, performance measurement of a correction system relied on test documents built internally by laboratories, companies, groups, or individuals; and most of the test documents were built manually by experts at a high cost.

Moreover, since the total number of test documents is not significant due to the cost or time for building the test documents (if built at all), it is difficult to consider that the entire linguistic errors are tested reliably.

Therefore, there is a need to develop a technique that automatically generates test documents based on actual errors committed by document writers even for non-linguistic experts once they are allowed to access a large amount of document information to test a correction system.

PRIOR ART REFERENCES

Patents (Patent 1) Korea laid-open patent 10-2015-0092879
(Patent 2) Korea laid-open patent 10-2018-0113849
(Patent 3) Korea laid-open patent 10-2019-0133624

SUMMARY

The present disclosure has been made in an effort to solve the problem in the conventional spelling error correction test techniques and to provide a system and method for generating test documents for context-sensitive spelling error correction to increase test efficiency by generating, based on statistical data, various errors found in plain documents written in text.

The present disclosure has been made in an effort to provide a system and method for generating test documents for context-sensitive spelling error correction that enables to build a highly reliable spelling error correction system by automatically generating and utilizing test documents to measure the performance of a spelling error correction system.

The present disclosure has been made in an effort to provide a system and method for generating test documents for context-sensitive spelling error correction that enables to acquire correct and error words in pairs by extracting, based on a large amount of corpus information, actual errors committed by a human during document writing and applying the errors to error-free documents used as an input for test document generation.

The present disclosure has been made in an effort to provide a system and method for generating test documents for context-sensitive spelling error correction that enables to reduce the cost for building test documents by automatically generating an error document close to an actual one at a low cost.

The present disclosure uses N-gram information on a large-scale corpus collected from ordinary people without involving correction and, thus, intends to provide a system and method for generating test documents for context-sensitive spelling error correction that enables to generate an error-intensive document based on the actual human error information.

The present disclosure finds error words related to each other with reference to the surrounding context of a word using N-grams and, thus, intends to provide a system and method for generating test documents for context-sensitive spelling error correction that enables performance measurement in a flexible manner by letting the error types of words change adaptively according to their surrounding context even if the words are the same.

The present disclosure automatically obtains a lot of error words and correct words corresponding to the error words using various good quality documents and, thus, intends to provide a system and method for generating test documents for context-sensitive spelling error correction that enables to perform various tests on a correction system at a low cost.

The present disclosure intends to provide a system and method for generating test documents for context-sensitive spelling error correction that enables to measure the performance of an error correction system with a high test difficulty and high reliability by calculating a context probability using a probability model and presenting error words that people frequently commit.

The technical objects of the present disclosure are not limited to those described above, and other technical objects not mentioned above may be clearly understood from the descriptions given below by those skilled in the art to which the present disclosure belongs.

To achieve the objects above, a system for generating test documents for context-sensitive spelling error correction according to the present disclosure comprises an input unit inputting an error-free document for generating an error document; an error target word segment test unit checking possibility of an error in a word segment by sequentially examining word segments of the entire sentences in the document input through the input unit and searching for a candidate word appearing at the corresponding position together with surrounding context; an error word candidate selection unit selecting error word candidates through filtering based on an edit distance between a word found by the error target word segment test unit and a correct word and keyboard typographical error categories for characters; and an error word determination and presentation unit calculating probabilities of an error word candidate and its surrounding context and determining an error word of the highest priority as a final error word.

Here, the error target word segment test unit is characterized in that it finds all words co-occurring in the surrounding context of a key word for generating error words using information on N-grams.

The error target word segment test unit finds candidate words through a pre-built N-gram dictionary using candidate words=$<w_{i-2}, w_{i-1}, *>\cup<w_{i-1}, *, w_{i+1}>\cup<*, w_{i+1}, w_{i+2}>, *=w_i$ and searches N-grams spanning word segments in both sides (adjacent word segments: $w_{i-2}, w_{i-1}, w_{i+1}, w_{i+2}$) around the position "*" of a key word ($*=w_i$), where the search is conducted to find all statistical candidate words appearing simultaneously with context words adjacent to the key word position "*".

The error word candidate selection unit is characterized in that it selects an error candidate word using an error word filter utilizing a set of all candidate words co-occurring in the surrounding context.

The error word filter is characterized in that it operates based on a distance between adjacent keys corresponding to the keyboard input alphabet letters and an edit distance between a key word and a candidate word.

The keyboard typographical error categories include omission of a letter, addition of a letter, repeated typing of a letter, omission of a repeated letter, typing of a wrong letter, interchange of two adjacent letters, and a combination of all the preceding input errors; and an error input is determined among neighboring keyboard letters adjacent to a target input letter on the keyboard.

The error word determination and presentation unit is characterized in that it recognizes a relationship between context probabilities of a correct word and an error candidate word using a noisy channel model and selects a candidate word not exceeding the probability of the correct word as an error word by calculating $$\hat{I} = \underset{I}{\mathrm{argmax}}\, p(I \mid O) = \underset{I}{\mathrm{argmax}}\, \frac{p(I)p(O \mid I)}{p(O)} = \underset{I}{\mathrm{argmax}}\, p(I)p(O \mid I),$$

where the probability p(O) of output data is a constant, p(I) represents a language model, and p(O|I) represents a channel probability distribution.

The language model p(I) is defined as a probability distribution of a character string that a user tries to input, the channel probability p(O|I) is defined as an occurrence rate of typing error, and the approximate value $\hat{I}$ is obtained by calculating a probability formed by a candidate word and its context.

To achieve another object, a method for generating test documents for context-sensitive spelling error correction according to the present disclosure comprises inputting an error-free document for generating an error document and sequentially examining word segments of the entire sentences in the document; determining whether an error candidate word appears in a word segment and determining the corresponding word segment as an error generating word segment when the candidate word exists in the word segment; filtering candidate words into error candidate words and selecting an error candidate word by considering a keyboard input process and an edit distance; and calculating probabilities of filtered error candidate words and surrounding context of a key word segment and reflecting an error in the document using an error word having the highest priority through comparison of probabilities or through random selection among error candidate words.

The system and method for generating test documents for context-sensitive spelling error correction according to the present disclosure described above provides the following effects.

First, test efficiency may be improved by generating, based on statistical data, various errors found in plain documents written in text.

Second, a highly reliable spelling error correction system may be built by automatically generating and utilizing test documents to measure the performance of a spelling error correction system.

Third, correct and error words may be obtained in pairs by extracting, based on a large amount of corpus information, actual errors committed by a human during document writing and applying the errors to error-free documents used as an input for test document generation.

Fourth, the cost for building test documents may be reduced by automatically generating an error document close to an actual one at a low cost.

Fifth, since N-gram information on a large-scale corpus collected from ordinary people without involving correction is used, an error-intensive document may be generated based on the actual human error information.

Sixth, error words related to each other are found with reference to the surrounding context of a word using N-grams, performance may be measured in a flexible manner by letting the error types of words change adaptively according to their surrounding context even if the words are the same.

Seventh, since a lot of error words and correct answers corresponding to the error words are obtained automatically using various good quality documents, various tests may be performed on a correction system at a low cost.

Eighth, the performance of an error correction system with a high test difficulty and high reliability may be measured by calculating a context probability using a probability model and presenting error words that people frequently commit.

BRIEF DESCRIPTION OF THE DRAWINGS

FIG. 3 is a flow diagram illustrating a method for generating test documents for context-sensitive spelling error correction according to the present disclosure.

DETAILED DESCRIPTION

In what follows, a system and method for generating test documents for context-sensitive spelling error correction according to the present disclosure will be described.

The characteristics and advantages of a system and method for generating test documents for context-sensitive spelling error correction according to the present disclosure will be made clear through detailed descriptions of the respective embodiments below.

Figure 1:
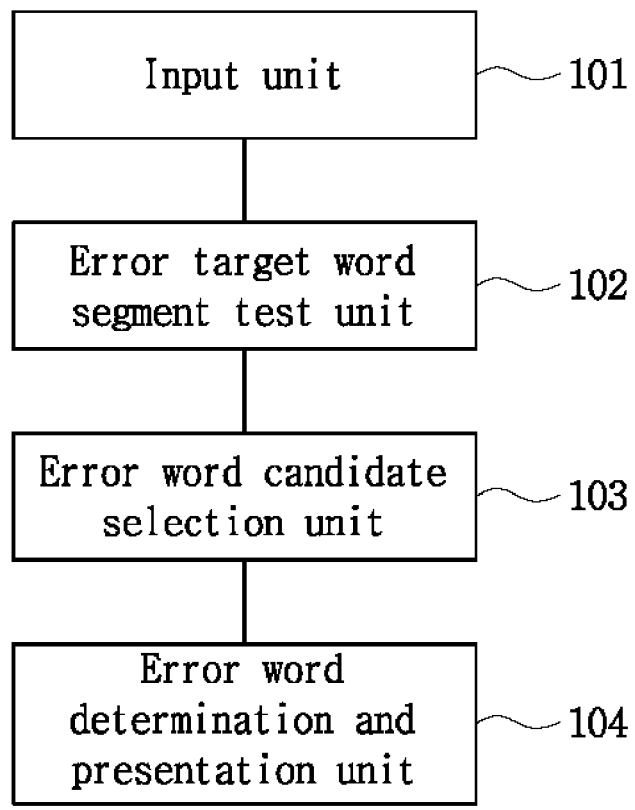
FIG. 1 illustrates a block diagram of a system for generating test documents for context-sensitive spelling error correction according to the present disclosure.

FIG. 1 illustrates a block diagram of a system for generating test documents for context-sensitive spelling error correction according to the present disclosure.

The present disclosure relates to automatic generation of test documents for performance measurement of a correction system in a keyboard input environment and may include a structure that recognizes context of an error-free document, obtains an error probability of a word at the corresponding position in the document from statistical information of actual users, and finally reflects error words in the document.

Since the present disclosure extracts, based on a large amount of corpus information, actual errors committed by people during document writing and applies errors to the error-free document used as an input for generation of test documents, the present disclosure may include a structure that enables to obtain correct words and error words in pairs.

Since the present disclosure finds error words related to each other with reference to the surrounding context of a word using N-grams, the present disclosure enables performance measurement in a flexible manner by letting the error types of words change adaptively according to their surrounding context even if the words are the same.

According to the present disclosure, statistical information is used for automatic generation of test documents and a vast amount of web data is used to obtain keyboard typographical errors committed by a human.

The main reason for using web data in the present disclosure is that a corpus basically uses pre-corrected data. Since web data is a corpus constructed without correcting the user's mistake, the web data is suitable for generating an actual error word.

As shown in FIG. 1, a system for generating test documents for context-sensitive spelling error correction according to the present disclosure includes an input unit 101 inputting an error-free document for generating an error document, an error target word segment test unit 102 checking possibility of an error in a word segment by sequentially examining word segments of the entire sentences in the document input through the input unit 101 and searching for a candidate word appearing at the corresponding position (a key word segment for examination) together with surrounding context; an error word candidate selection unit 103 selecting error word candidates by considering edit distances between candidate words found at the corresponding position and a correct word (a key word segment for examination) and keyboard typographical errors; and an error word determination and presentation unit 104 calculating probabilities of an error word candidate and its surrounding context and determining an error word of the highest priority or an error word selected randomly among the entire error words as a final error word.

In what follows, a system for generating test documents for context-sensitive spelling error correction according to the present disclosure will be described in detail according to the respective steps.

The error target word segment test unit 102 searches widely for error candidate words that may appear at a target word segment for examination and searches for co-occurring candidate words with reference to surrounding context using the information on 3-grams.

$$\text{candidate words} = <w_{i-2}, w_{i-1}, *> \cup <w_{i-1}, *, w_{i+1}> \cup <*, w_{i+1}, w_{i+2}>, *=w_i \quad [\text{Eq. 1}]$$

As shown in Eq. 1, a candidate word is obtained through a pre-built 3-gram dictionary, and 3-grams spanning two word segments in both directions (adjacent word segments: $w_{i-2}, w_{i-1}, w_{i+1}, w_{i+2}$) are searched around the position "*" of a key word (*=$w_i$), where the search is conducted to find all statistical candidate words appearing simultaneously with context words adjacent to the key word position "*".

The error word candidate selection unit 103 selects an error candidate word using an error word filter utilizing a set of all candidate words co-occurring in the surrounding context.

The error word filter classifies a candidate word based on the criteria of Table 1 that shows classification of an error into one of 8 cases; the filter operates based on a distance between adjacent keys corresponding to the keyboard input alphabet letters and an edit distance between a key word and a candidate word.

Table 1 shows classification of keyboard typographical errors.

TABLE 1

| CODE | Classification | Example | Edit distance |
|---|---|---|---|
| OX | Omission of a letter | major/maor | 1 |
| XO | Addition of a letter | this/thjis | 1 |
| DOUB12 | Signle letter instead of double letter | operation/opperation | 1 |
| DOUB21 | Double letter instead of single letter | succeeded/succeded | 1 |
| XY | Substitution of one letter | continue/continur | 1 |
| SWAP | Interchange of two adjacent letters | atlanta/altanta | 2 |
| MANY | Two or more of the same type or of different types | payed/paid | 2-N |

Figure 2:
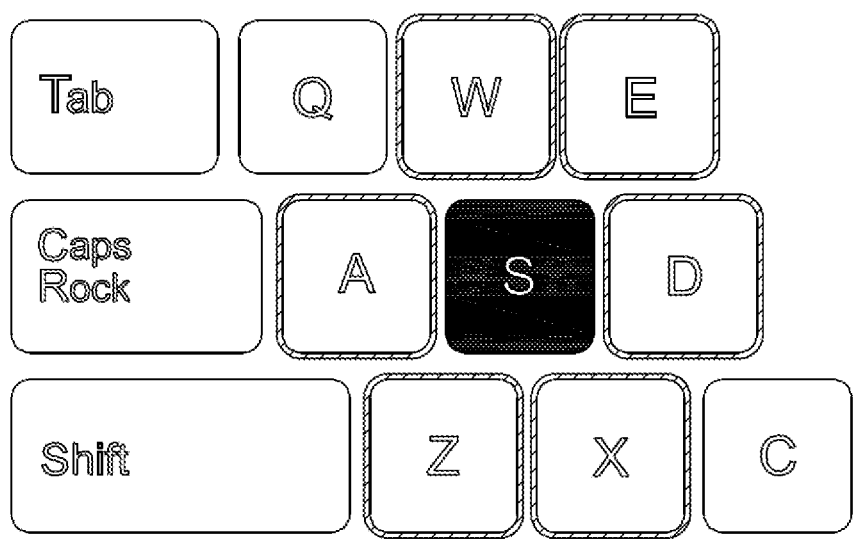
FIG. 2 illustrates a keyboard typographical error range.

FIG. 2 illustrates a keyboard typographical error range.

OX corresponds to a case where a user thinks he or she has entered a keyboard input, but because the pressure on a target keyboard letter "S" is not sufficient, the user input is not input (for example, slow/low); XO corresponds to a case where, while pressing a target keyboard letter "S", the user presses an adjacent keyboard letter together (for example, slow/sdlow, wslow); DOUB21 corresponds to a case where a target keyboard letter "S" is pressed repeatedly (for example, sslow); DOUB12 corresponds to a case where, although a target keyboard letter "S" has to be entered twice, one of the two inputs is omitted in the same way as the OX case (for example, success/succes); XY corresponds to a case where an adjacent keyboard letter is input instead of a target keyboard "S" (for example, slow/dlow, wlow); SWAP corresponds to a case where two adjacent alphabet letters are interchanged during a keyboard input process (for example, slow/lsow, slwo); and finally, MANY corresponds to a case where one of the cases occurs repeatedly or a combination of the cases occurs.

The error word determination and presentation unit 104 uses a method based on a noisy channel model, a statistical language model published by Shannon.

The noisy channel model is used to determine and present a final error word; the noisy channel model is employed when an error document is generated using error words of the highest priority. On the other hand, when an error document is generated by random selection, the error document is generated without involving statistical calculations using error candidate words obtained from the error word candidate selection unit 103.

The error document is generated using two criteria to conduct a balanced performance test.

The noisy channel model assumes that input data may be distorted to produce output data due to the noise present in the channel and restores the input data from the output data using a decoder.

The reason for generating an error word using the method above is to make the difficulty of correction increased so that performance measurement of a correction system against keyboard typographical errors becomes complicated. The relationship between context probabilities of a correct word and an error candidate word is recognized using the noisy channel model, and a candidate word not exceeding the probability of the correct word is selected as an error word.

$$\hat{I} = \operatorname*{argmax}_{I} p(I \mid O) = \operatorname*{argmax}_{I} \frac{p(I)p(O \mid I)}{p(O)} = \operatorname*{argmax}_{I} p(I)p(O \mid I). \quad [\text{Eq. 2}]$$

The restoration problem based on the noisy channel model is formulated by the Bayes theorem, where the probability of output data p(O) is a constant.

Referring to Eq. 2, two probability distributions are defined: a language model p(I) and a channel probability p(O|I).

The noisy channel model of Eq. 2 may be applied to other application fields depending on how the language model p(I) and the channel probability p(O|I) are interpreted.

According to the present disclosure, the language model p(I) is defined as a probability distribution of a character string that a user tries to input, the channel probability p(O|I) is defined as an occurrence rate of typing error, and the approximate value Î is obtained by calculating a probability formed by a candidate word and its context.

$$\hat{W} = \operatorname*{argmax}_{W} p(W)p(Y \mid W) \quad [\text{Eq. 3}]$$

$$\hat{T} = \operatorname*{argmax}_{T} p(w_1, \ldots, T, \ldots, w_n)p(Y \mid W) \quad [\text{Eq. 4}]$$

In Eq. 2, if the input data I is substituted by a word sequence W of one document that the user tries to input, and the output data O is substituted by a word sequence Y of a document actually seen by the user, a test document generation model for context-sensitive spelling error correction is constructed as shown in Eq. 3.

Suppose the input word sequence is W, the output word sequence is Y, a word is changed to T while it passes through the noisy channel, and other words are not changed while passing through the noisy channel; then, the test document generation model may be considered to be a problem of choosing T that maximizes the probability p(W)p(Y|W).

Therefore, Eq. 3 is rephrased as Eq. 4.

When the N-gram model is used as a language model, an approximate value T̂ for the probability distribution P(W) of the word sequence W may be calculated by Eq. 5.

At this time, since the N-gram not including T is a constant term, it may be excluded from the equation, and in Eq. 5, $L_C$ and $R_C$ represent the left and right surrounding context, respectively, when T appears at the position of a set of error candidate words t.

$$\hat{T} = \operatorname*{argmax}_{w_i \in T} \prod_{k=t-(N-1)}^{t+(N-1)} p(w_k \mid w_{k-(N-1)}, \ldots, w_{k-1})p(Y \mid W), \quad [\text{Eq. 5}]$$

$$\begin{cases} w_k \in L_C & \text{if } k < t \\ w_k \in f(T) & \text{if } k = t \\ w_k \in R_C & \text{if } k > t \end{cases}$$

The codomain of the function f(T) is a set of all words that are output as T by the noise of the noisy channel, and N is a number representing the order of the N-gram model, where the approximate value is calculated using the 3-gram model employed in the present disclosure, as shown in Eq. 6.

$$\hat{T} = \operatorname*{argmax}_{w_i \in f(T)} p(w_t \mid w_{t-2}, w_{t-1}) \quad [\text{Eq. 6}]$$

$$p(w_{t+1} \mid w_{t-1}, w_t)p(w_{t+2} \mid w_t, w_{t+1})p(Y \mid W)$$

$$p(Y \mid W) = \begin{cases} 1 - \varepsilon & Y = W \\ \varepsilon & \text{otherwise} \end{cases} \quad [\text{Eq. 7}]$$

In Eq. 7, ε represents the occurrence rate of actual spelling errors; if an input word sequence W is the same as an output word sequence Y, the probability of spelling error is calculated by 1−ε, and ε is used for calculation of a probability for the remaining unequal sentences.

The occurrence rate of spelling error may differ depending on the type of spelling error, and although it is difficult to quantify the occurrence rate of spelling errors due to a typographical error, it is assumed that all spelling errors occur at the same rate, as defined in Eq. 7.

Instead of applying the assumption above, a statistical model adaptive to a document environment may be constructed by defining the occurrence rate of spelling errors as a value configured for the purpose of the user.

In what follows, a method for generating test documents for context-sensitive spelling error correction according to the present disclosure will be described in detail.

FIG. 3 is a flow diagram illustrating a method for generating test documents for context-sensitive spelling error correction according to the present disclosure.

First, an error-free document for generating an error document is input S301, and word segments of the entire sentences in the document are examined sequentially S302.

Whether an error candidate word appears in a word segment is determined, and if no candidate word is found in the word segment, subsequent word segments are examined while, if there exists a candidate word in the word segment, the corresponding word segment is determined as an error generating word segment S303.

Error candidate words are obtained by filtering candidate words, which are determined by considering a keyboard input process and edit distances S304.

The probabilities of the filtered error candidate words and surrounding context of a key word segment are calculated S305, and an error is reflected in the document using an error word having the highest priority through comparison of the probabilities or through random selection among error candidate words S306.

When the process is completed, it is determined whether a subsequent word segment or sentence exists S307, and whether to terminate the system is determined.

As described above, the method for generating test document for context-sensitive spelling error according to the present disclosure sequentially checks, from the first word segment to the last one in units of sentences, whether a word segment is an error generation target word segment.

There may be as many as hundreds of thousands of candidate words for a test word segment, for which filtering is applied by considering edit distances to the test word segment and keyboard input distances; for example, in the sentence "The City Purchasing Department, the jury said, "is lacking in experienced clerical personnel as a result of city personnel policies". It urged that the city "take steps to remedy" this problem.", "result" is assumed as a key word segment.

A pre-built, large-scale 3-gram dictionary is searched for (as a *), (a * of), and (* of city) spanning two word segments using the key word segment "result" as a reference. If error filtering is applied on the candidate words that may come into the position of "*" based on Table 1 and the descriptions of FIG. 2, typographical error information with respect to "result" actually committed by people in the corresponding context may be obtained, such as "reuslt" (SWAP), "rsult" (OX), and "resuly"(XY).

Among the error candidate words, a candidate word with the highest probability of occurrence with respect to the corresponding context is selected as an error word, or a candidate word is selected randomly to generate an error document.

The system and method for generating test documents for context-sensitive spelling error correction according to the present disclosure described above reduces the cost for building test documents by automatically generating an error document close to an actual one at a low cost and performs various tests on a correction system at a low cost since a lot of error words and correct answers corresponding to the error words are obtained automatically using various good quality documents.

As described above, it should be understood that the present disclosure may be implemented in other modified forms without departing from the inherent characteristics of the present disclosure.

In this respect, the disclosed embodiments should be considered in a descriptive point of view rather than restrictive point of view, the technical scope of the present disclosure should be judged by the appended claims rather than the descriptions given above, and all of the discrepancies which may be found within the range equivalent to the technical scope of the present disclosure should be interpreted to belong to the present disclosure.

DESCRIPTIONS OF SYMBOLS

101: Input unit
102: Error target word segment test unit
103: Error word candidate selection unit
104: Error word determination and presentation unit

What is claimed is:

1. A system for generating test documents for context-sensitive spelling error correction, comprising:
a processor configured to:
input an error-free document for generating an error document;
check possibility of an error in a word segment by sequentially examining word segments of entire sentences in the document and search for a candidate word appearing at a corresponding position together with surrounding context;
select error word candidates through filtering based on an edit distance between a word found by checking the possibility of the error in the word segment and a correct word and keyboard typographical error categories for characters; and
calculate probabilities of an error word candidate and its surrounding context and determine an error word of a highest priority as a final error word,
recognize a relationship between context probabilities of a correct word and an error candidate word using a noisy channel model and select a candidate word not exceeding the probability of the correct word as an error word by calculating $$\hat{I} = \underset{I}{\operatorname{argmax}} p(I \mid O) = \underset{I}{\operatorname{argmax}} \frac{p(I)p(O \mid I)}{p(O)} = \underset{I}{\operatorname{argmax}} p(I)p(O \mid I),$$

where probability p(O) of output data is a constant, p(I) represents a language model, p(O|I) represents a channel probability distribution, the language model p(I) is defined as a probability distribution of a character string that a user tries to input, the channel probability p(O|I) is defined as an occurrence rate of typing error, and the approximate value $\hat{I}$ is obtained by calculating a probability formed by a candidate word and its context.

2. The system of claim 1, wherein the processor is further configured to find all words co-occurring in the surrounding context of a key word for generating error words using information on N-grams.

3. The system of claim 1, wherein the processor is further configured to find candidate words through a pre-built N-gram dictionary using candidate words=<$w_{i-2}, w_{i-1}$,*>∪<$w_{i-1}$,*,$w_{i+1}$>∪<*, $w_{i+1}, w_{i+2}$>, *=$w_i$ and search N-grams spanning word segments in both sides (adjacent word segments: $w_{i-2}$, $w_{i-1}$, $w_{i+1}$, $w_{i+2}$) around the position "*" of a key word (*=$w_i$), wherein the search is conducted to find all statistical candidate words appearing simultaneously with context words adjacent to the key word position "*".

4. The system of claim 1, wherein the processor is further configured to select an error candidate word using an error word filter utilizing a set of all candidate words co-occurring in the surrounding context.

5. The system of claim 4, wherein the error word filter operates based on a distance between adjacent keys corresponding to a keyboard input, alphabet letters, and an edit distance between a key word and a candidate word.

6. The system of claim 1, wherein the keyboard typographical error categories include omission of a letter, addition of a letter, repeated typing of a letter, omission of a repeated letter, typing of a wrong letter, interchange of two adjacent letters, and a combination of all preceding input errors, and
an error input is determined among neighboring keyboard letters adjacent to a target input letter on the keyboard.

7. A method for generating test documents for context-sensitive spelling error correction, comprising:
inputting, by a processor, an error-free document for generating an error document and sequentially examining word segments of entire sentences in the document;
determining, by the processor, whether an error candidate word appears in a word segment and determining a corresponding word segment as an error generating word segment when the error candidate word exists in the word segment;

filtering, by the processor, candidate words into error candidate words and selecting an error candidate word by considering a keyboard input process and an edit distance;

calculating, by the processor, probabilities of filtered error candidate words and surrounding context of a key word segment and reflecting an error in the document using an error word having the highest priority through comparison of probabilities or through random selection among error candidate words; and recognizing, by the processor, a relationship between context probabilities of a correct word and an error candidate word using a noisy channel model and selecting a candidate word not exceeding the probability of the correct word as an error word by calculating $$\hat{I} = \operatorname*{argmax}_{I} p(I \mid O) = \operatorname*{argmax}_{I} \frac{p(I)p(O \mid I)}{p(O)} = \operatorname*{argmax}_{I} p(I)p(O \mid I),$$

where probability p(O) of output data is a constant, p(I) represents a language model, p(O|I) represents a channel probability distribution, the language model p(I) is defined as a probability distribution of a character string that a user tries to input, the channel probability p(O|I) is defined as an occurrence rate of typing error, and the approximate value $\hat{I}$ is obtained by calculating a probability formed by a candidate word and its context.

* * * * *